US008677386B2

(12) United States Patent
Amento et al.

(10) Patent No.: US 8,677,386 B2
(45) Date of Patent: Mar. 18, 2014

(54) AUTOMATIC RATING SYSTEM USING BACKGROUND AUDIO CUES

(75) Inventors: Brian Amento, Morris Plains, NJ (US); Christopher Harrison, Mount Kisco, NY (US); Larry Stead, Upper Montclair, NJ (US)

(73) Assignee: AT&T Intellectual Property II, LP, Atlanta, GA (US)

( * ) Notice: Subject to any disclaimer, the term of this patent is extended or adjusted under 35 U.S.C. 154(b) by 515 days.

(21) Appl. No.: 12/006,311

(22) Filed: Jan. 2, 2008

(65) Prior Publication Data
US 2009/0172098 A1 Jul. 2, 2009

(51) Int. Cl.
*H04H 60/33* (2008.01)
*H04H 60/56* (2008.01)

(52) U.S. Cl.
USPC .................................. 725/12; 725/9; 725/10

(58) Field of Classification Search
USPC ............................................................ 725/14
See application file for complete search history.

(56) References Cited

U.S. PATENT DOCUMENTS

| | | | |
|---|---|---|---|
| 7,237,250 B2 * | 6/2007 | Kanojia et al. ................... | 725/36 |
| 2003/0093784 A1 * | 5/2003 | Dimitrova et al. ............... | 725/10 |
| 2005/0055708 A1 * | 3/2005 | Gould et al. ..................... | 725/25 |
| 2005/0071865 A1 * | 3/2005 | Martins ........................... | 725/10 |
| 2006/0048189 A1 * | 3/2006 | Park et al. ........................ | 725/46 |
| 2006/0136965 A1 * | 6/2006 | Ellis et al. ........................ | 725/46 |
| 2007/0186228 A1 * | 8/2007 | Ramaswamy et al. .......... | 725/14 |

* cited by examiner

*Primary Examiner* — Justin Shepard
(74) *Attorney, Agent, or Firm* — Guntin & Gust, PLC; Ralph Trementozzi

(57) ABSTRACT

Methods and systems for capturing, transmitting and processing data for generating ratings relating to multimedia programming based on passively obtained user cues are disclosed herein.

20 Claims, 3 Drawing Sheets

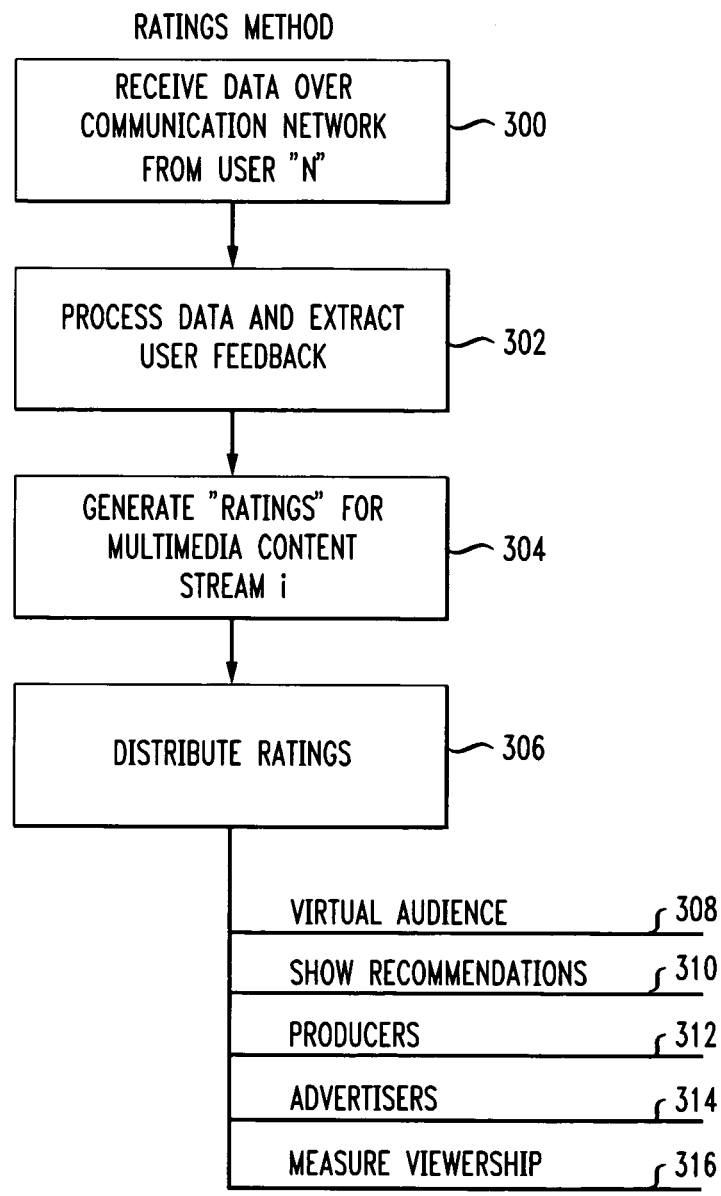

AUTOMATIC RATING SYSTEM USING BACKGROUND AUDIO CUES

FIELD OF THE INVENTION

The present invention relates generally to providing multimedia content over a communications network, and more particularly, to an automated system for rating such multimedia content based on cues that are passively gathered from the user.

BACKGROUND OF THE INVENTION

The delivery of multimedia and other content over communications networks is well known in the art. Examples include, but are not limited to, web browsing, File Transfer Protocol (FTP), Internet Protocol (IP) services such as Voice-over-IP (VoIP), and even conventional Cable Television (CATV) over Hybrid Fiber Coax (HFC).

In the context of television programming, delivered either via HFC, IP or the like, current technology enables users to provide ratings for such programming (or other dynamic media such as radio, CD, audio books, etc.). However, the current state of the art requires that the users actively provide such feedback. This is often accomplished by the user manipulating a remote control or keyboard. For example, the well known TiVo® remote has data input controls for accepting such user input. However, the need for active user participation decreases the likelihood for the typical TV audience to provide any feedback.

It would therefore be desirable to provide a system and methodology whereby a viewer of multimedia content can provide feedback to a service provider or other entity in a transparent, non-invasive way that obviates the need for explicit viewer participation.

SUMMARY OF THE INVENTION

In accordance with aspects of the invention(s), methods and systems for capturing, transmitting and processing data for generating ratings relating to multimedia programming based on passively obtained user cues are disclosed herein.

An exemplary method, in the broadest sense, generally comprises the step of: receiving data over the communications network, the data comprising cues providing feedback regarding the multimedia content from at least one of the end users in a manner transparent to the user.

In accordance with another aspect of the invention, a system for gathering user feedback, that can be used for example, to rate multimedia content that is distributed to end users over a communications network, comprises: a network element adapted for receiving data over the communications network, the data comprising cues providing feedback regarding the multimedia content from at least one of the end users in a manner transparent to the user.

In accordance with still another aspect of the invention, a memory medium containing programmable machine readable instructions which, when executed by a processor, enable a network element to obtain rating data regarding multimedia content that is communicated to end users over a communications network, enable a system, device, network or other entity or apparatus to receive data over the communications network, where the data comprises cues providing feedback regarding the multimedia content from at least one of the end users in a manner transparent to the user.

These and further advantages will become apparent to those skilled in the art as the present invention is described with particular reference to the accompanying drawings.

BRIEF DESCRIPTION OF THE DRAWINGS

FIG. 3 is a flow chart describing a Ratings Method.

DETAILED DESCRIPTION OF THE INVENTION

Embodiments of the invention will be described with reference to the accompanying drawing figures wherein like numbers represent like elements throughout. Before embodiments of the invention are explained in detail, it is to be understood that the invention is not limited in its application to the details of the examples set forth in the following description or illustrated in the figures. The invention is capable of other embodiments and of being practiced or carried out in a variety of applications and in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

Figure 1:
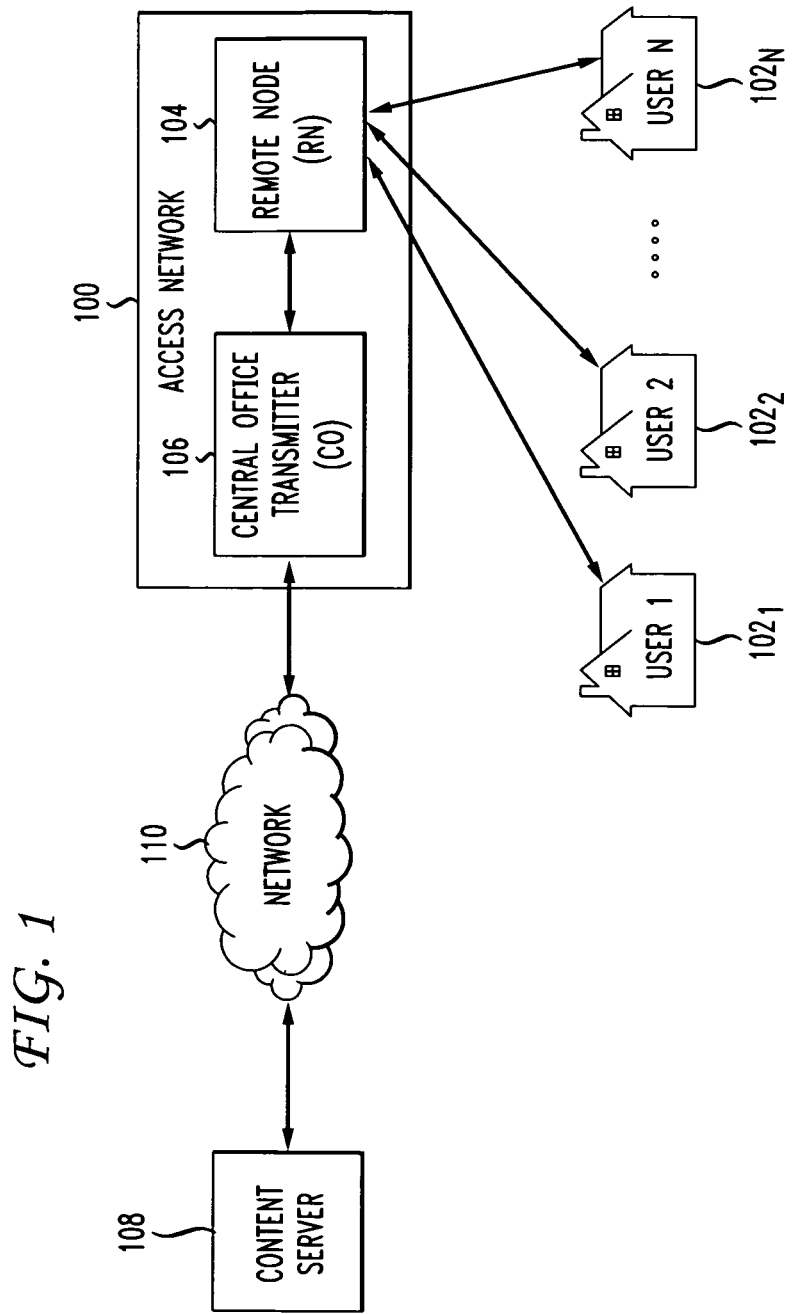
FIG. 1 is a schematic of an illustrative network architecture embodying a Hybrid Fiber Coax (HFC) network serving a plurality of users.

In accordance with a first aspect of the invention, a method and system for rating multimedia content is disclosed. With reference to FIG. 1, an illustrative network architecture in the form a Hybrid Fiber Coax (HFC) delivery system is shown, which generally comprises an access network 100 that delivers communications services to a plurality of end users $102_1$, $102_2$, ..., $102_N$. The access network may comprise, in an exemplary expedient (shown here as an optical network) a Remote Node (RN) 104 coupled to a Central Office (CO) 106 or other entity. The RN 104 may be adapted to communicate with the end users $102_1$, $102_2$, ..., $102_N$ via optical, electrical, electro-optical, or any other hereinafter developed network technology. The CO 106 and RN 104 communicate with each other in a conventional fashion and such communications and system architectures are not relevant to the present invention. In the context of multimedia content delivery, a content server 108 that generates or stores multimedia content is coupled to the access network via another network shown generally at 110.

Figure 2:
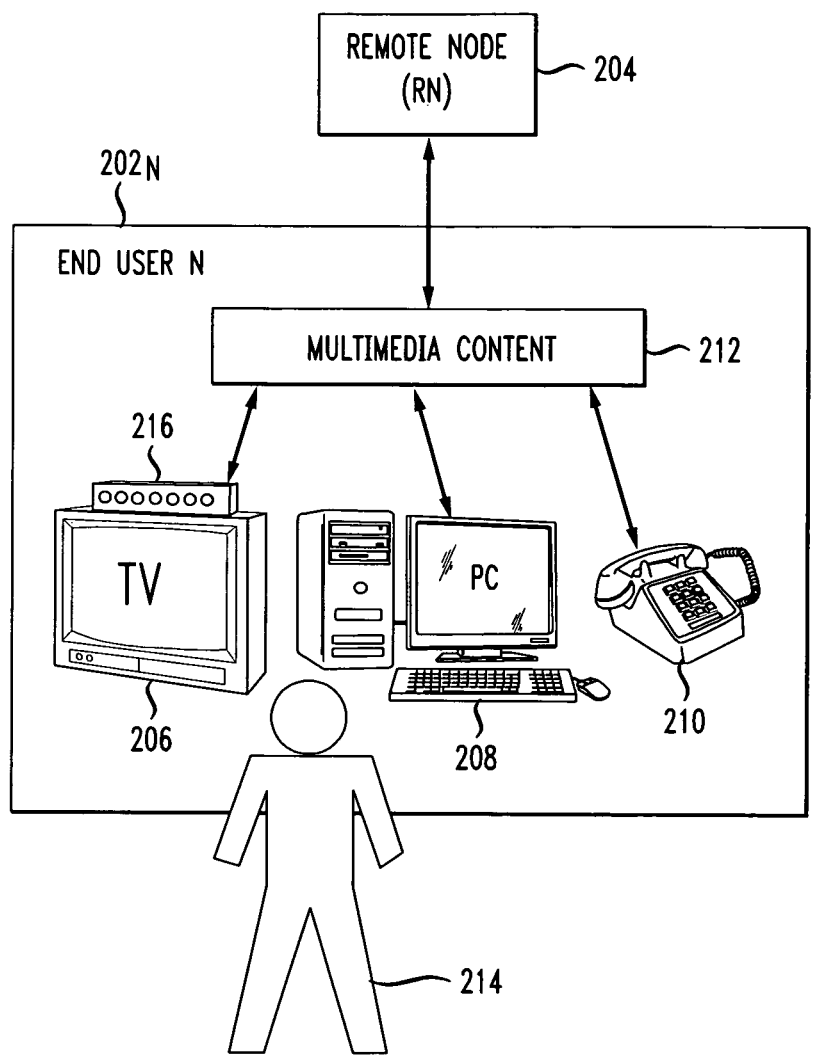
FIG. 2 is a schematic of a user site that provides for multimedia content distribution to a user and a remote node communicating with the user site.

FIG. 2 is a schematic of a RN 204 coupled to an exemplary end user site $202_N$ (e.g., a residence or business). End user site $202_N$ may include a plurality of network access devices, such as, for example, a TV 206, personal computer 208, telephone 210 and/or the like. Multimedia content 212 is presented to an end user 214 in a conventional manner via the network access device. In accordance with the present invention, a passive feedback device 216, which is either part of the network access device or a standalone apparatus, enables data comprising "user cues" to be transparently "received" from the viewer of the multimedia content. The "data" may be in the form of audio, visual or audio-visual "cues." In this regard, the passive feedback device 216 may be a microphone, video camera or some like apparatus that is adapted to be coupled to the network.

With reference to FIG. 3, a method in accordance with an aspect of the invention for rating multimedia content is disclosed. The method generally comprises the step 300 of receiving data over a communications network from an end user, where such data comprises cues that provide real-time (or almost real-time) user feedback concerning the multimedia content. In step 302, a "system" (architecture is not relevant at this point) processes the data and extracts the user "feedback", which may be in the form of a viewer laughing or otherwise reacting to something seen in the programming.

The cues, as previously discussed, may be aural, visual or audio-visual in nature and can be measured in terms of intensity and/or duration. Such cues may further be processed with specific regard to the multimedia content stream i to enable a service provider or other entity to generate "ratings" for the programming in step 304. In this context, the cues may be temporally mapped against the content which could then be distributed in step 306 for multiple purposes, including but not limited to virtual audiences 308, providing show recommendations 310, enabling producers to understand which content is most likely to generate the best revenue 312, advertisers 314 and service providers (e.g., TV networks) 316.

For example, a particular "comedy" might cause a viewer to laugh, an interesting documentary might elicit a thought provoking discussion, or a horror "flick" might cause shock or fear. These aural, visual or audio-visual cues may be identified, captured and processed by the network access device in real or quasi real-time. A variety of acoustic models can be created to monitor different aural cues, such as a scream which, obviously, has different properties than laughter. In the case of conversation, the inventive method can identify dialog without the need for complicated speech recognition technology, or the need to even understand the content at all. Such mapping of user's audio or visual expressions for the purpose of authentication is known in the art.

In addition to monitoring the frequency and duration of such cues, in accordance with aspects of the invention, an interested entity or device can record when such viewer feedback is generated. For example, a set-top box (in the HFC context) knows what multimedia content (i.e., TV show) is being shown and the points in the show if and when, the viewer has which type of reactions thereto. This data, as described above, can be temporally correlated with the media content, thereby enabling the generation of a continuous ratings profile.

Another aspect of the invention comprises a memory medium storing machine readable instructions which, when executed by a processor enable a system, device or other entity/apparatus to generate the above-described ratings from passively obtained user cues. The memory medium may be part of the network access device described above, or disposed anywhere within the network or a separate entity responsible for generating ratings for multimedia programming. The memory medium and instructions may be embodied in software, hardware or firmware, as is well understood by those of ordinary skill in the art.

The foregoing detailed description is to be understood as being in every respect illustrative and exemplary, but not restrictive, and the scope of the invention disclosed herein is not to be determined from the description of the invention, but rather from the claims as interpreted according to the full breadth permitted by the patent laws. It is to be understood that various modifications will be implemented by those skilled in the art, without departing from the scope and spirit of the invention.

We claim:

1. A method of gathering feedback regarding multimedia content that is distributed to equipment of a plurality of end users over a communications network, the method comprising:

receiving at a network device data sent over the communications network, the data comprising audio-visual cues captured at a set top box during presentation of a multimedia content item to provide one of real-time or near real-time feedback regarding end user reaction to the multimedia content item, the feedback being from an end user of the plurality of end users, the data being obtained passively without alerting the end user that end user reactions are being monitored and without the end user performing an action to proactively identify the feedback in the data, wherein the feedback comprises audible feedback of the end user reaction to the multimedia content item;

processing the audio-visual cues at one of the network device or the set top box by identifying the feedback and by measuring the audio-visual cues based on an intensity and a duration of the feedback, wherein identifying of the feedback comprises detecting speech without using speech recognition;

temporally correlating the feedback identified from the processing of the audio-visual cues with the multimedia content item; and generating, for the multimedia content item, a continuous ratings profile based on the temporally correlating of the feedback.

2. The method recited in claim 1, wherein the audio-visual cues include audio cues that are sounds without speech.

3. The method recited in claim 1, wherein the processing of the audio-visual cues is performed at the network device, and wherein the continuous ratings profile comprises a temporal map of the multimedia content item to the feedback based on selected points in the multimedia content item.

4. The method recited in claim 1, wherein the audio-visual cues include distinguishable audio cues including screams and laughter.

5. The method recited in claim 1, wherein a passive feedback device at the set top box receives the audio-visual cues from the end user and wherein the passive feedback device comprises one of a microphone, a video camera, or a combination thereof that is adapted to be coupled to the communications network.

6. The method recited in claim 5, wherein the set top box is coupled to an optical network.

7. The method recited in claim 6, wherein the processing of the audio-visual cues comprises monitoring one of frequency, duration, or frequency and duration of the audio-visual cues.

8. The method recited in claim 1, wherein the set top box receives the audio-visual cues and generates the ratings profile relating to the multimedia content item.

9. A system to gather user feedback to multimedia content that is distributed to equipment of a plurality of end users over a communications network, comprising:

a network element, comprising:

a memory to store executable instructions; and a controller coupled to the memory, wherein the controller, responsive to executing the instructions, performs operations comprising:

receiving data over the communications network, the data comprising audio-visual cues providing at least user feedback regarding end user aural reaction to the multimedia content, the user feedback being from an end user of the plurality of end users and obtained without the end user proactively identifying the user feedback in the data, and without alerting the end user that end user reactions are being monitored;

processing the audio-visual cues by at least measuring the cues based on at least an intensity and a duration of the user feedback, wherein identifying of the feedback comprises detecting dialog without using speech recognition;

temporally correlating the feedback identified from the processing of the audio-visual cues with the multimedia content; and generating, for the multimedia content, a continuous ratings profile based on the temporally correlating of the feedback.

10. The system recited in claim 9, wherein the audio cues include sounds without speech.

11. The system recited in claim 9, wherein the controller, responsive to executing the instructions, performs operations comprising receiving visual cues.

12. The system of claim 11, wherein the continuous ratings profile is determined for the multimedia content, based on the audio-visual cues, and wherein the controller, responsive to executing the instructions, performs operations comprising performing image recognition on the audio-visual cues to determine a visual expression of the end user of the plurality of end users.

13. The system recited in claim 9, wherein the controller, responsive to executing the instructions, performs operations comprising receiving the audio-visual cues using at least a microphone and a video camera.

14. The system recited in claim 9, wherein the network element comprises a set top box coupled to a hybrid fiber coax distribution network.

15. A non-transitory memory medium containing programmable machine readable instructions which, responsive to being executed by a processor, cause the processor to perform operations comprising:

receiving data over a communications network, the data comprising audio-visual cues providing feedback from equipment of a plurality of end users regarding captured end user reactions to multimedia content without the plurality of end users proactively identifying the feedback in the data, the feedback being from an end user of the plurality of end users, and the data being obtained without alerting the end user that the end user reactions are being monitored, wherein obtaining of the data comprises detecting speech without using speech recognition;

processing the audio-visual cues by measuring the cues based on an intensity, and a duration of the feedback;

temporally correlating the feedback identified from the processing of the audio-visual cues with the multimedia content; and generating, for the multimedia content, a continuous ratings profile based on the temporally correlating of the feedback.

16. The non-transitory memory medium recited in claim 15, wherein the audio-visual cues include audio cues comprising sounds without speech.

17. The non-transitory memory medium recited in claim 15, wherein the audio-visual cues include video cues.

18. The non-transitory memory medium recited in claim 15, wherein the audio-visual cues are compared with acoustic models used to monitor aural cues that distinguish between screams and laughter.

19. The method of claim 1, comprising determining, by one of the network device or the set top box, a rating for the multimedia content item based on audio cues.

20. The method of claim 1, wherein the processing of the audio-visual cues comprises measuring the audio-visual cues based on intensity and duration of feedback captured by a microphone and a video camera.

* * * * *